US010327254B2

(12) United States Patent
Thanayankizil et al.

(10) Patent No.: US 10,327,254 B2
(45) Date of Patent: Jun. 18, 2019

(54) METHOD FOR INTERFERENCE MANAGEMENT IN VEHICLES WITH MULTIPLE VEHICLE HOTSPOTS

(71) Applicant: GM Global Technology Operations LLC, Detroit, MI (US)

(72) Inventors: Lakshmi V. Thanayankizil, Rochester Hills, MI (US); David P. Pop, Garden City, MI (US); Fan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 101 days.

(21) Appl. No.: 15/222,549

(22) Filed: Jul. 28, 2016

(65) Prior Publication Data

US 2018/0035434 A1 Feb. 1, 2018

(51) Int. Cl.
| | | |
|---|---|---|
| *H04W 4/00* | (2018.01) | |
| *H04W 72/08* | (2009.01) | |
| *H04L 29/08* | (2006.01) | |
| *H04W 76/10* | (2018.01) | |
| *H04W 72/00* | (2009.01) | |
| *H04W 24/02* | (2009.01) | |
| *H04W 84/00* | (2009.01) | |

(52) U.S. Cl.
CPC .......... *H04W 72/082* (2013.01); *H04L 67/12* (2013.01); *H04L 67/18* (2013.01); *H04W 72/00* (2013.01); *H04W 76/10* (2018.02); *H04W 24/02* (2013.01); *H04W 84/005* (2013.01)

(58) Field of Classification Search
CPC ... H04W 72/082; H04W 76/10; H04W 67/12; H04W 24/02; H04W 84/005
See application file for complete search history.

(56) References Cited

U.S. PATENT DOCUMENTS

| | | | | |
|---|---|---|---|---|
| 7,346,357 B1* | 3/2008 | Kim | ...................... | H04W 16/04 |
| | | | | 455/446 |
| 2003/0040319 A1* | 2/2003 | Hansen | ................. | H04W 16/10 |
| | | | | 455/452.1 |
| 2003/0157975 A1* | 8/2003 | Kadel | ................. | H04W 84/005 |
| | | | | 455/41.2 |
| 2006/0227751 A1* | 10/2006 | Theobold | .............. | H04W 16/18 |
| | | | | 370/338 |

(Continued)

OTHER PUBLICATIONS

Cheng, Chen-Mou, "Adjacent Channel Interference in Dual-radio 802.11a Nodes and Its Impact on Multi-hop Networking", IEEE, 2006, 6 pages.

*Primary Examiner* — Maharishi V Khirodhar
(74) *Attorney, Agent, or Firm* — Reising Ethington P.C.; David Willoughby

(57) ABSTRACT

A system and method for operating a first vehicle hotspot at a vehicle. The first vehicle hotspot operates to provide wireless connectivity for one or more wireless devices located in the vehicle or within a proximity of the vehicle. The method is carried out by the vehicle and includes the steps of: detecting one or more channels of operation occupied by one or more other hotspots; selecting a channel of operation for the first vehicle hotspot according to a hotspot coordination policy; and configuring the first vehicle hotspot to use the selected channel of operation thereby allowing the one or more wireless devices to connect to the first vehicle hotspot through wireless communication over the selected channel of operation.

18 Claims, 4 Drawing Sheets

(56) References Cited

U.S. PATENT DOCUMENTS

| | | | |
|---|---|---|---|
| 2006/0291413 A1* | 12/2006 | Rossier | H04W 16/04 370/329 |
| 2007/0104139 A1* | 5/2007 | Marinier | H04W 28/18 370/329 |
| 2007/0201540 A1* | 8/2007 | Berkman | H04B 3/542 375/219 |
| 2012/0307917 A1* | 12/2012 | Goldhamer | H04B 3/32 375/257 |
| 2015/0063323 A1* | 3/2015 | Sadek | H04W 72/1215 370/336 |
| 2016/0007278 A1* | 1/2016 | Gupta | H04W 76/10 370/329 |
| 2017/0086203 A1* | 3/2017 | Chong | H04W 24/02 |
| 2018/0049035 A1* | 2/2018 | Nakayama | H04W 16/10 |

\* cited by examiner

METHOD FOR INTERFERENCE MANAGEMENT IN VEHICLES WITH MULTIPLE VEHICLE HOTSPOTS

TECHNICAL FIELD

The present disclosure relates generally to hotspots in a vehicle and, more specifically, to managing interference of wireless signals through coordination of hotspots in a vehicle.

BACKGROUND

Due to the affordability of mobile devices and the ever-increasing quantum of applications provided thereon, the number of mobile devices is increasing along with the amount of data used. Furthermore, more applications are being developed to integrate these mobile devices into vehicle systems, for purposes, such as, to provide Internet accessibility. Such vehicles include a telematics unit or similar device that can operate to provide Internet accessibility to the mobile devices via a cellular network. Most wireless networks whereto the mobile devices connect only provide a single wireless access point (i.e. hotspot). This can lead to slow communications between a network (e.g., the Internet) and the mobile devices because all devices would have to pass data through the single hotspot and be communicated over a single channel of operation (i.e. a certain frequency or frequency range) thereby causing a bottlenecking effect. Introducing more hotspots helps ail this bottlenecking problem; however, it may create adjacent channel and/or co-channel interference depending on the degree of channel overlap and the amount of hotspots on a given channel.

SUMMARY

According to an embodiment of the invention, there is provided a method of operating a plurality of vehicle hotspots, wherein the vehicle includes vehicle electronics that include the plurality of vehicle hotspots each which operate over one of the possible channels of operation to provide wireless network connectivity for one or more wireless devices located in the vehicle or within a proximity of the vehicle, wherein the method is carried out by the vehicle electronics and comprises the steps of: detecting a change in operation of a hotspot in interest, wherein the hotspot in interest is any of the plurality of vehicle hotspots; determining one or more channels of operation being used by the plurality of vehicle hotspots; selecting at least one channel of operation for at least one of the plurality of vehicle hotspots in accordance with a hotspot coordination policy based on the determination made in step (b); and configuring the plurality of vehicle hotspots to operate on the selected channel(s) of operation.

According to another embodiment of the invention, there is provided a method for operating a first vehicle hotspot at a vehicle, wherein the vehicle includes vehicle electronics that include the first vehicle hotspot which operates to provide wireless connectivity for one or more wireless devices located in the vehicle or within a proximity of the vehicle, wherein the method is carried out by the vehicle electronics and comprises the steps of: detecting one or more channels of operation occupied by one or more other hotspots; selecting a channel of operation for the first vehicle hotspot according to a hotspot coordination policy; and configuring the first vehicle hotspot to use the selected channel of operation thereby allowing the one or more wireless devices to connect to the first vehicle hotspot through wireless communication over the selected channel of operation.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and methods described below operate to provide one or more hotspots in a vehicle. The system described provides one embodiment of a system that can be used to carry out the methods. Vehicle devices and/or non-vehicle devices with wireless communication capabilities may connect to the vehicle hotspots (i.e. wireless access points). Herein, "vehicle hotspot" refers to a hotspot or wireless access point that is a part of the vehicle electronics and may be an OEM-installed or aftermarket device that provides wireless connectivity for one or more wireless devices. According to the specific protocol used, a vehicle hotspot may operate over a certain channel of operation. The system and method allow for coordination and management of the multiple vehicle hotspots such that the interference therebetween is minimized. This will allow for faster and more reliable wireless data communications.

Many wireless protocols operate using radio bands. For example, WiFi uses the 2.4 GHz and 5 GHz bands. These radio bands may provide for multiple channels of operation wherein a channel of operation corresponds with a certain frequency or frequency range. Although a channel may be associated with a certain frequency, the channel may use a multitude of frequencies to transmit data. Here, the channel (e.g., 2.412 GHz with a channel width of 22 MHz) may merely act as a centering point with respect to the frequencies used over that channel (e.g., data may be transmitted at frequencies ranging from 2.412 GHz±22 MHz). Furthermore, channels of operation may be staggered such that these ranges overlap. This raises two issues: (1) co-channel interference; and (2) adjacent channel interference. Co-channel interference is the interference that is created when multiple devices operate over the same channel of operation. Adjacent channel interference is the interference or noise caused by devices operating over adjacent channels of operation whose channel band ranges overlap. The methods below allow for coordination of the channels of operation such that both of these types of interference may be minimized and data transfer rates may thereby be maximized.

System—

Figure 1:
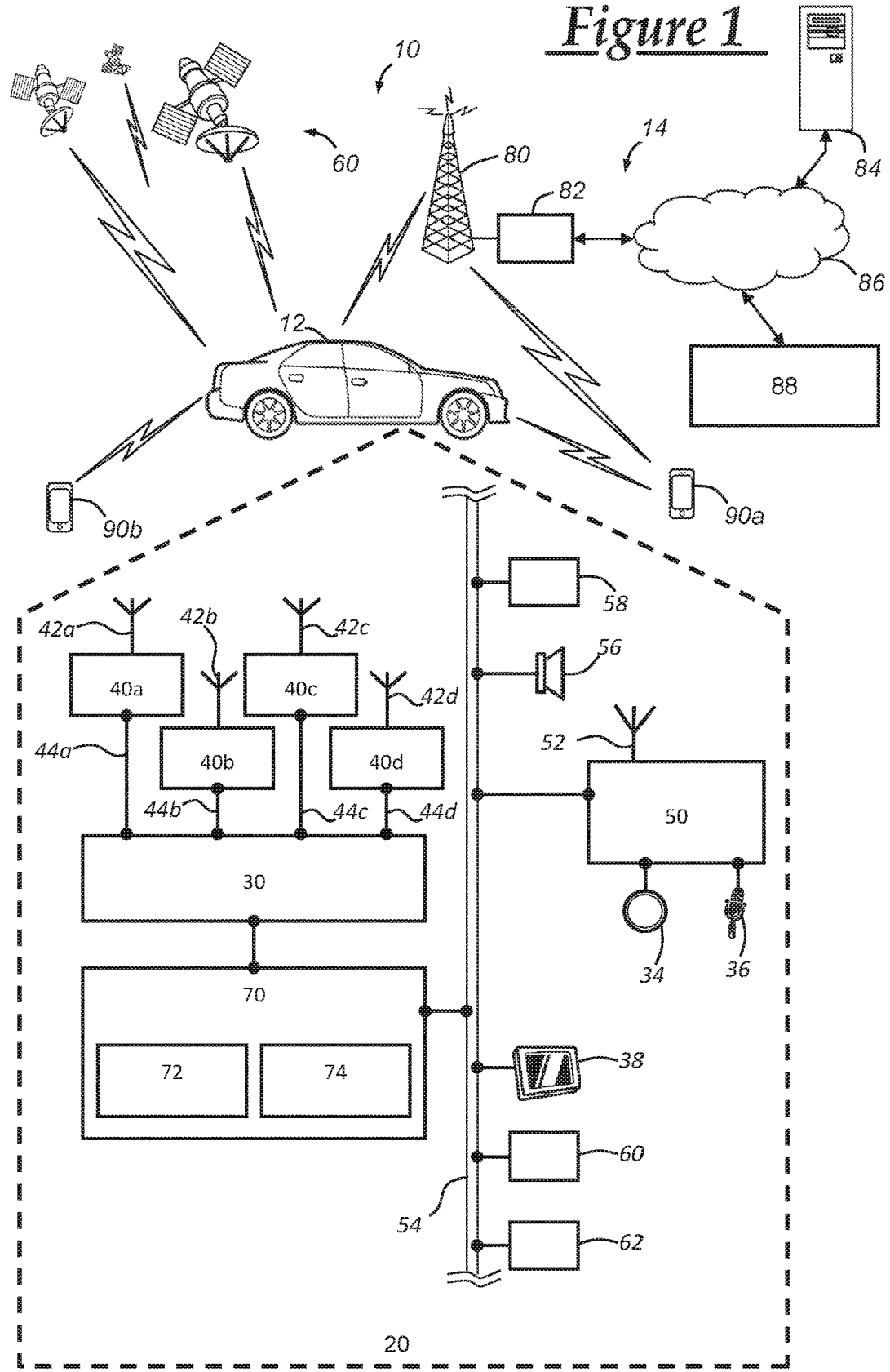
FIG. 1 is a block diagram depicting an embodiment of a communications system that is capable of utilizing the method herein.

Referring first to FIG. 1, there is provided a system 10 that provides for the operation of multiple hotspots. The system 10 may be used to carry out the methods described herein. System 10 generally contains a vehicle 12 and a cellular network 14. Vehicle 12 may connect via a wired or wireless connection to devices 90a and 90b through use of vehicle electronics 20 which is included in the vehicle, and may provide Internet to these devices via cellular network 14. Vehicle electronics 20 includes a router 30, wireless access points or hotspots 40a-d, a telematics unit 50, a controller 70, and other modules, devices, and components, as well as communication busses, such as communication bus 54. Cellular network 14 includes a plurality of cell towers 80 (only one shown), one or more mobile switching centers (MSCs) 82 (only one shown), a land network 86, a remote facility 88, and a computer 84. It should be appreciated that the disclosed methods can be used with any number of different systems and are not specifically limited to the operating environment shown here. Thus, the following paragraphs simply provide a brief overview of one such system 10; however, other systems not shown here could employ the disclosed methods as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a router 30, wireless access points 40a-d (WAPs) (i.e. hotspots), a telematics unit 50, a GPS module 60, a controller 70, and numerous other components and devices. Some or all of the different vehicle electronics may be connected for communication with each other via one or more communication busses, such as bus 54. Communications bus 54 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Wireless router 30 operates by providing multiple vehicle hotspots or wireless access points 40a-d for vehicle 12 and can be an OEM-installed (embedded) or aftermarket device that is installed in the vehicle and that may direct traffic between one or more devices, namely for directing traffic between one or more wireless devices 90 and the Internet. Router 30 may be operatively connected to telematics unit 50 (or even integrated therein), thereby enabling router 30 to communicate with remote devices and/or establish an Internet connection via sending and receiving data transmissions over one or more wireless protocols described below with respect to telematics unit 50. Wireless access points 40a-d may be integrated within router 30 or may be separate devices that are either OEM-installed and/or aftermarket devices. Each wireless access point includes an antenna 42a-d thereby enabling the router 30 to transmit and receive wireless signals to and from devices 90a and 90b via the wireless access points. The wireless access points 40a-d and the router 30 may operate according to a wireless protocol. For example, the wireless protocol may be a WiFi protocol that uses IEEE 802.11b or IEEE 802.11g standards. Router 30 may be connected to bus 54 thereby allowing router 30 to provide Internet (or other network) connectivity to any device also connected to bus 54. Controller 70 is connected to router 30 and controls operation of the router according to the illustrated method of FIG. 4.

Controller 70 may be part of router 30 or may be a separate stand-alone module. Controller 70 may be directly wired to router 30, wired to bus 54, and/or may be a wireless controller. Controller 70 includes a processor 74, memory 72, software, and interface circuitry to interact with router 30 and devices over bus 54. The processor and memory enable the controller to implement software or firmware installed thereon. Controller 70 carries out various vehicle functions, namely functions used to operate router 30. For example, controller 70 may direct router 30 to configure the channel of operations for each of the respective WAPs 40a-d. For another example, router 30 may be powered on, powered off, reset, or set to a low-power standby mode or other mode by controller 70. In addition, if controller 70 is connected to bus 54, controller 70 may control operations of other various electronic components that are also connected to bus 54. In this regard, controller 70 may be integrated in with another portion of vehicle electronics 20 and need not be a dedicated module used only for controlling router 30.

Telematics unit 50 can be an OEM-installed (embedded) or aftermarket device that is installed in the vehicle and that enables wireless voice and/or data communication over cellular network 14 and via wireless networking. This enables the vehicle to communicate with remote facility 88, devices 90, other telematics-enabled vehicles, or some other entity or device. The telematics unit preferably uses radio transmissions to establish a communications channel (a voice channel and/or a data channel) with cellular network 14 so that voice and/or data transmissions can be sent and received over the channel. By providing both voice and data communication, telematics unit 50 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the remote facility 88) and data communication (e.g., to provide GPS location data or vehicle diagnostic data to the remote facility 88), the system can utilize a single call over a voice channel and switch as needed between voice and data transmission over the voice channel, and this can be done using techniques known to those skilled in the art.

According to one embodiment, telematics unit 50 utilizes cellular communication according to either GSM, CDMA, LTE, VoLTE, or any other suitable standard and thus includes a cellular chipset (not shown) for voice communications like hands-free calling, a wireless modem for data transmission, an electronic processing device (not shown), one or more digital memory devices (not shown), and an antenna 52. It should be appreciated that the modem can either be implemented through software that is stored in the telematics unit and is executed by the processor, or it can be a separate hardware component located internal or external to telematics unit 50. The modem can operate using any number of different standards or protocols such as LTE, EVDO, CDMA, GPRS, and EDGE. Wireless networking between the vehicle and other networked devices can also be carried out using telematics unit 50. For this purpose, telematics unit 50 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can be set up to automatically receive an assigned IP address from another device on the network such as a router or from a network address server.

Telematics unit 50 can be used to provide a diverse range of vehicle services that involve wireless communication to and/or from the vehicle. Such services include: turn-by-turn directions and other navigation-related services that are provided in conjunction with the GPS-based vehicle navigation module 60; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 50, but are simply an enumeration of some of the services that the telematics unit is capable of offering. Furthermore, it should be understood that at least some of the aforementioned modules could be implemented in the form of software instructions saved internal or external to telematics unit 50, they could be hardware components located internal or external to telematics unit 50, or they could be integrated and/or shared with each other or with other systems located throughout the vehicle, to cite but a few possibilities. In the event that the modules are implemented as VSMs 62 located external to telematics unit 50, they could utilize bus 54 to exchange data and commands with the telematics unit.

GPS module 60 receives radio signals from a constellation of GPS satellites (not shown). From these signals, the module 60 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 60), or some or all navigation services can be done via telematics unit 50, wherein the position information is sent to a remote location for purposes of providing the vehicle with navigation maps, map annotations (points of interest, restaurants, etc.), route calculations, and the like. The position information can be supplied to remote facility 88 or other remote computer system, such as computer 84, for other purposes, such as fleet management. Also, new or updated map data can be downloaded to the GPS module 60 from the remote facility 88 via the telematics unit 50.

Apart from the GPS module 60, the vehicle 12 can include other vehicle system modules (VSMs) 62 in the form of electronic hardware components that are located throughout the vehicle and typically receive input from one or more sensors and use the sensed input to perform diagnostic, monitoring, control, reporting and/or other functions. Each of the VSMs 62 is preferably connected by communications bus 54 to the other VSMs, as well as to the telematics unit 50, and can be programmed to run vehicle system and subsystem diagnostic tests. As examples, one VSM 62 can be an engine control module (ECM) that controls various aspects of engine operation such as fuel ignition and ignition timing, another VSM 62 can be a powertrain control module that regulates operation of one or more components of the vehicle powertrain, and another VSM 62 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 20 also includes a number of vehicle user interfaces that provide vehicle occupants with a means of providing and/or receiving information, including pushbuttons(s) 34, microphone 36, visual display 38, audio system 56, and pedestrian friendly alert function (PFAF) 58. As used herein, the term 'vehicle user interface' broadly includes any suitable form of electronic device, including both hardware and software components, which is located on the vehicle and enables a vehicle user to communicate with or through a component of the vehicle. Microphone 36 provides audio input to the telematics unit to enable the driver or other occupant to provide voice commands and carry out hands-free calling via the cellular network 14. For this purpose, it can be connected to an on-board automated voice processing unit utilizing human-machine interface (HMI) technology known in the art. The pushbutton(s) 34 allow manual user input into the telematics unit 50 to initiate wireless telephone calls and provide other data, response, or control input. Separate pushbuttons can be used for initiating emergency calls versus regular service assistance calls to the remote facility 88. Audio system 56 provides audio output to a vehicle occupant and can be a dedicated, stand-alone system or part of a primary vehicle audio system. According to the particular embodiment shown here, audio system 56 is operatively coupled to communications bus 54 and can provide sound from sources such as AM, FM and satellite radio, CD, DVD and other multimedia sources. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless cellular network 14 may be a cellular carrier system that includes a plurality of cell towers 80 (only one shown), one or more mobile switching centers (MSCs) 82 (only one shown), as well as any other networking components required to connect cell towers 80 with land network 86. Each cell tower 80 includes sending and receiving antennas and a base station, with the base stations from different cell towers being connected to the MSC 82 either directly or via intermediary equipment such as a base station controller. Cellular network 14 can implement any suitable communications technology, including for example, analog technologies such as AMPS, or the newer digital technologies such as LTE, EVDO, CDMA, GPRS, and EDGE. As will be appreciated by those skilled in the art, various cell tower/base station/MSC arrangements are possible and could be used with cellular network 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using cell towers 80 and MSCs 82, cellular network 14 could be implemented as a different wireless carrier system in the form of satellite communication that can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the transmitting station, packaged for upload, and then sent to the satellite, which broadcasts the programming to subscribers. Bi-directional communication can be, for example, satellite telephony services using one or more satellites to relay telephone communications between the vehicle 12 and the uplink station. If used, this satellite telephony can be utilized either in addition to or in lieu of cellular network 14.

Land network 86 may be a conventional land-based telecommunications network that is connected to one or more landline telephones and connects cell towers 80 to remote facility 88. For example, land network 86 may include a public switched telephone network (PSTN) such as that used to provide hardwired telephony, packet-switched data communications, and the Internet infrastructure. One or more segments of land network 86 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 88 need not be connected via land network 86, but could include wireless telephony equipment so that it can communicate directly with a wireless network.

Computer 84 can be one of a number of computers accessible via a private or public network such as the Internet. Each such computer 84 can be used for one or more purposes, such as a web server accessible by the router 30 via telematics unit 50 and cell towers 80. Other such accessible computers 84 can be, for example: a service center computer where diagnostic information and other vehicle data can be uploaded from the vehicle via the telematics unit 50; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 88, or both. A computer 84 can also be used for providing Internet connectivity such as DNS services or as a network address server that uses DHCP or other suitable protocol to assign an IP address to the vehicle 12.

Remote facility 88 is designed to provide the vehicle electronics 20 with a number of different system back-end functions. The remote facility 88 may include one or more switches, servers, databases, live advisors, as well as an automated voice response system (VRS), all of which are known in the art. Remote facility 88 may include any or all of these various components and, preferably, each of the various components are coupled to one another via a wired or wireless local area network. Remote facility 88 may receive and transmit data via a modem connected to land network 86. A database at the remote facility can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned remote facility 88 using a live advisor, it will be appreciated that the remote facility can instead utilize a VRS as an automated advisor or, a combination of the VRS and the live advisor can be used.

The wireless devices 90*a* and 90*b* are non-vehicle devices, meaning that they are not a part of vehicle 12 or vehicle electronics 20. Both devices 90*a* and 90*b* may also be referred to as an "external device" since they are external to vehicle electronics 20, regardless of whether they may be located inside or outside the vehicle at any one time. The wireless devices 90*a* and 90*b* include: hardware, software, and/or firmware enabling cellular telecommunications and/or short range wireless communication (SRWC), as well as other wireless device functions and applications. The hardware of the wireless devices 90*a* and 90*b* comprises a processor and memory for storing the software, firmware, etc. This memory may include volatile RAM or other temporary powered memory, as well as a non-transitory computer readable medium that stores some or all of the software needed to carry out the various external device functions discussed herein. The wireless device processor and software stored in the memory enable various software applications, which may be preinstalled or installed by the user (or manufacturer) (e.g., having a software application or graphical user interface (GUI)). This may include a wireless device application via which a vehicle user can communicate with the vehicle 12 and/or control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 90*a* or 90*b* to activate or de-activate operation of the mobile hotspot from the respective device. Wireless devices 90*a* and 90*b* are shown as smartphones having cellular telephone capability. In other embodiments, device 90*a* or 90*b* may be a tablet, laptop computer, or any other suitable device. In addition, the application may also allow the user to connect with the remote facility 88 or call center advisors at any time.

Figure 2:
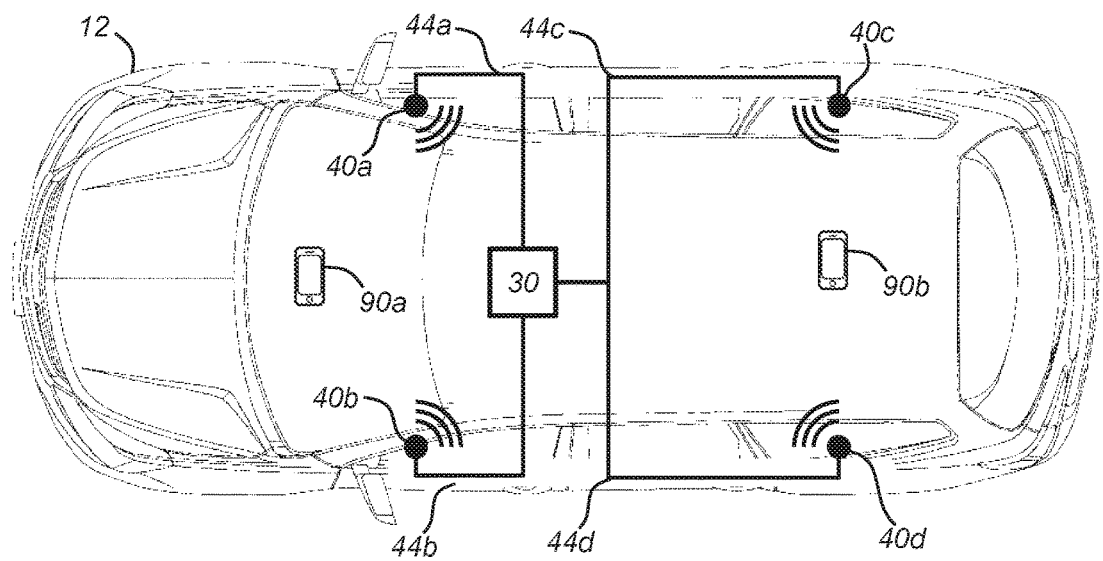
FIG. 2 is a block diagram depicting an embodiment of an arrangement of vehicle components and other system components.

Referring now to FIG. 2, vehicle 12 is illustrated from an overhead view such that one possible configuration of certain components and devices of vehicle electronics 20 is shown. Router 30 is shown connected via buses 44*a-d* to WAPs 40*a-d*. The wireless access points may be positioned throughout vehicle 12 and connected to router 30 in any configuration or arrangement and it should be appreciated that the illustration shown is only one example. Mobile device 90*a* or 90*b* may connect to the router via any of the WAPs 40*a-d*. After a connection therebetween is established, the respective WAP to which the device is connected may pass data to and from router 30, which, in turn, communicates the data with one or more networks such as the Internet. For example, after a connection is established between device 90*a* and WAP 40*b*, then data, such as an HTTP request, may be communicated from WAP 40*b* via bus 44*b* to router 30. Router 30 then can provide the data to telematics unit 50 which, through an established connection with cell tower 70, may communicate the data to land network 86 and finally to computer 84 or remote facility 88 whereby the request is received. As such with an HTTP request, along the way the HTTP domain name may be resolved and directed to the appropriate server, such as may exist in remote facility 88 or at computer 84.

Figure 3:
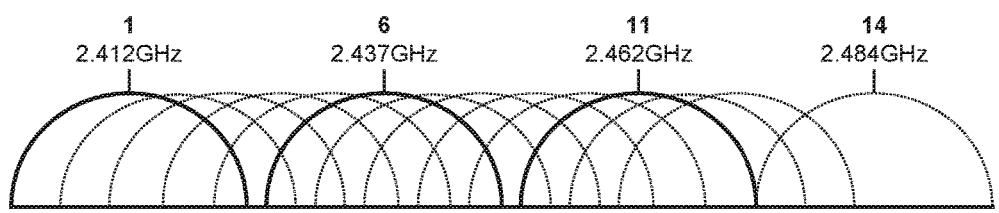
FIG. 3 is a graph showing an embodiment of wireless communication channels and their corresponding frequencies.

Referring now to FIG. 3, there is shown a graph illustrating the possible channels of operation that can be used by the 802.11g standard, such as would be used by a WiFi router using the 2.4 GHz frequency band. The horizontal axis represents ascending frequencies and the vertical access represents the frequency density, which is ascending from bottom to top. There are only four channels explicitly labeled and shown in FIG. 3 (channels 1, 6, 11, and 14). These four channels are commonly used because they do not overlap with each other thereby mitigating the effects of adjacent channel interference. The other channels that are not labeled are shown by dotted lines. It should be appreciated by those skilled in the art that certain countries have their own regulations as to which frequencies (or channels of operation) wireless devices may operate over. For example, under the IEEE 802.11g standard using the 2.4 GHz frequency band, in the United States of America, channels 1-11 are allowed for use while channels 12-14 are not.

It should also be appreciated that this is one illustration of what the channels, their center frequencies, and their overlap with one another might appear like if using an 802.11g standard using the 2.4 GHz frequency band. The overlap and spacing between the possible channels of operation may differ depending on the settings or configuration used and/or the electromagnetic properties of the environment in which they are used. For example, for an 802.11g standard using the 2.4 GHz frequency band, the band range is generally 22 MHz. Also, here, the center channel frequencies (four which are shown for channels 1, 6, 11, and 14) are generally separated by 5 MHz (except for channel 14's center frequency which is 12 MHz from channel 13's center frequency).

Method—

Figure 4:
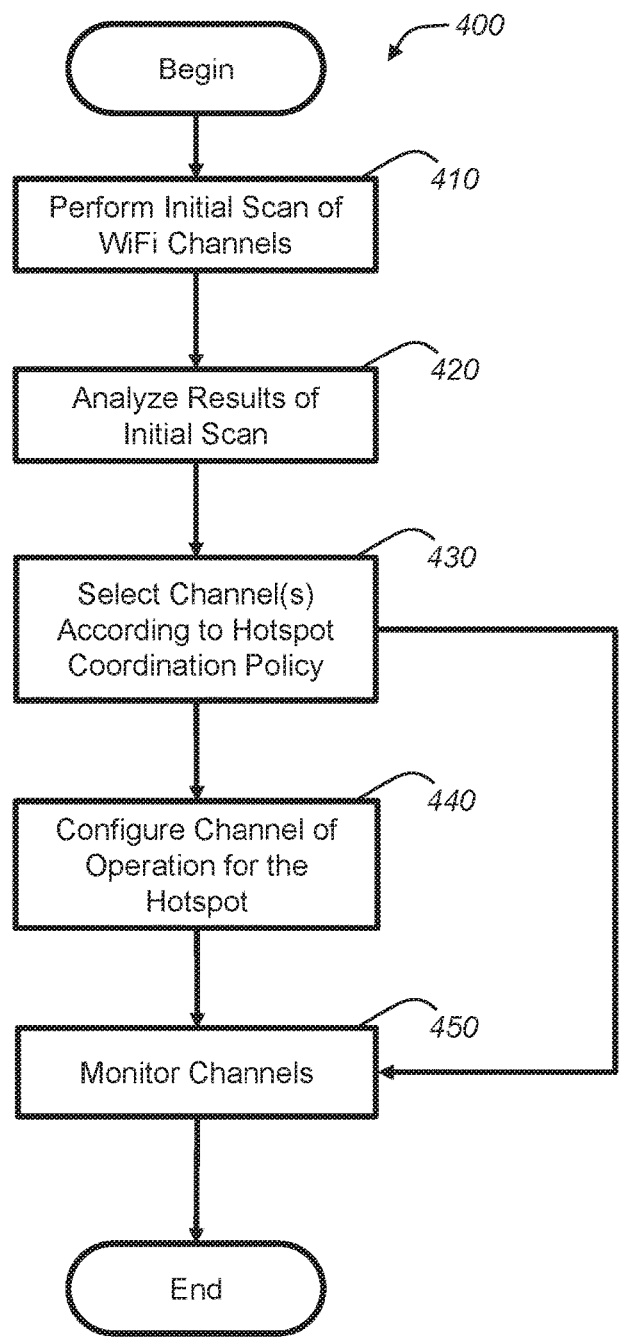
FIG. 4 is a flowchart illustrating a method of operating a first vehicle hotspot at a vehicle.

Referring now to FIG. 4, there is provided a method 400 for operating a plurality of vehicle hotspots. The method may begin when a new wireless access point or hotspot ("hotspot of interest") is turned on. Or, in anticipation of activating a new hotspot of interest, the method may be carried out such to configure the channel of operation before the hotspot is activated thereby enabling the hotspot to start up using the selected channel of operation. Alternatively, or additionally, the method may begin when a change in the hotspot configuration takes place (e.g., a hotspot changing its channel of operation, a hotspot deactivating, a device connecting or disconnecting from a hotspot). Controller 70 may continuously monitor the operation of router 30 and/or WAPs 40a-d such that configuration changes may be timely realized.

The method begins with step 410 whereby an initial scan of the wireless channels is performed. The initial scan is carried out using one or more of the WAPs 40a-d. In other embodiments, the initial scan may use a separate transceiver device. Or, in lieu of or in addition to the initial scan, controller 70 may query router 30 as to which WAPs are activated and what their corresponding channels of operation are. The initial scan will provide data that can be used to coordinate operation of the hotspots and to determine which channel of operation the hotspot of interest (e.g., the recently turned on hotspot) should use. For example, an initial scan can be performed via wireless access point 40a and the scan will report the results back to controller 70 via bus 44a and router 30. The scan may indicate the amount, identity, and other characteristics of nearby vehicle or non-vehicle wireless devices or access points. The scan may also acquire characteristics and measurements of certain devices and/or channels of operation. In some embodiments, it may be necessary only to scan the vehicle hotspots. This information may be compiled, analyzed, stored, or otherwise used by controller 70, such as for purposes of implementing a hotspot coordination policy. As used herein, a hotspot coordination policy refers to a certain methodology of coordinating the operation of the vehicle hotspots (e.g., WAPs 40a-d), as will be described below with respect to step 430.

After data is compiled in step 410, step 420 may be carried out wherein the results thereof may be used in making certain decisions that are useful in carrying out the hotspot coordination policy. Controller 70 may carry out this policy through use of a non-transitory computer-readable memory 72 and processor 74. Memory 72 may be used to store the software operations comprising the policy, to store the data resulting from the initial scan, and/or to store other data necessary to implementing the policy and/or carrying out other vehicle functions. Processor 74 may perform the calculations and operations such that the hotspot coordination policy may be implemented. Furthermore, controller 70 may receive data from other devices (i.e. any other device besides the hotspot of interest) such that it may be used to carry out the hotspot coordination policy. For example, memory 72 may store previous metrics of a certain hotspot configuration (i.e. the vehicle hotspots with their channel of operation). Such metrics may be useful for future determinations, such as determining the optimal channel of operation for a given hotspot. Useful metrics may include data packet loss percentage, ping time, and upload/download speed.

In step 430, the hotspot coordination policy begins. Here, it is determined which channels of operation are being used and the nature of their usage. The hotspot of interest may take the results of the scan, previously compiled information relating to the hotspots (e.g., default channels of operation of the hotspots, metrics of previous configurations), and other information that may be useful in determining an optimal configuration of the plurality of hotspots such that the overal operation of the vehicle hotspots is improved (e.g., improved operation may merely mean an increase in the data transfer rate between wireless devices 90 and the Internet or other network).

Figure 5:
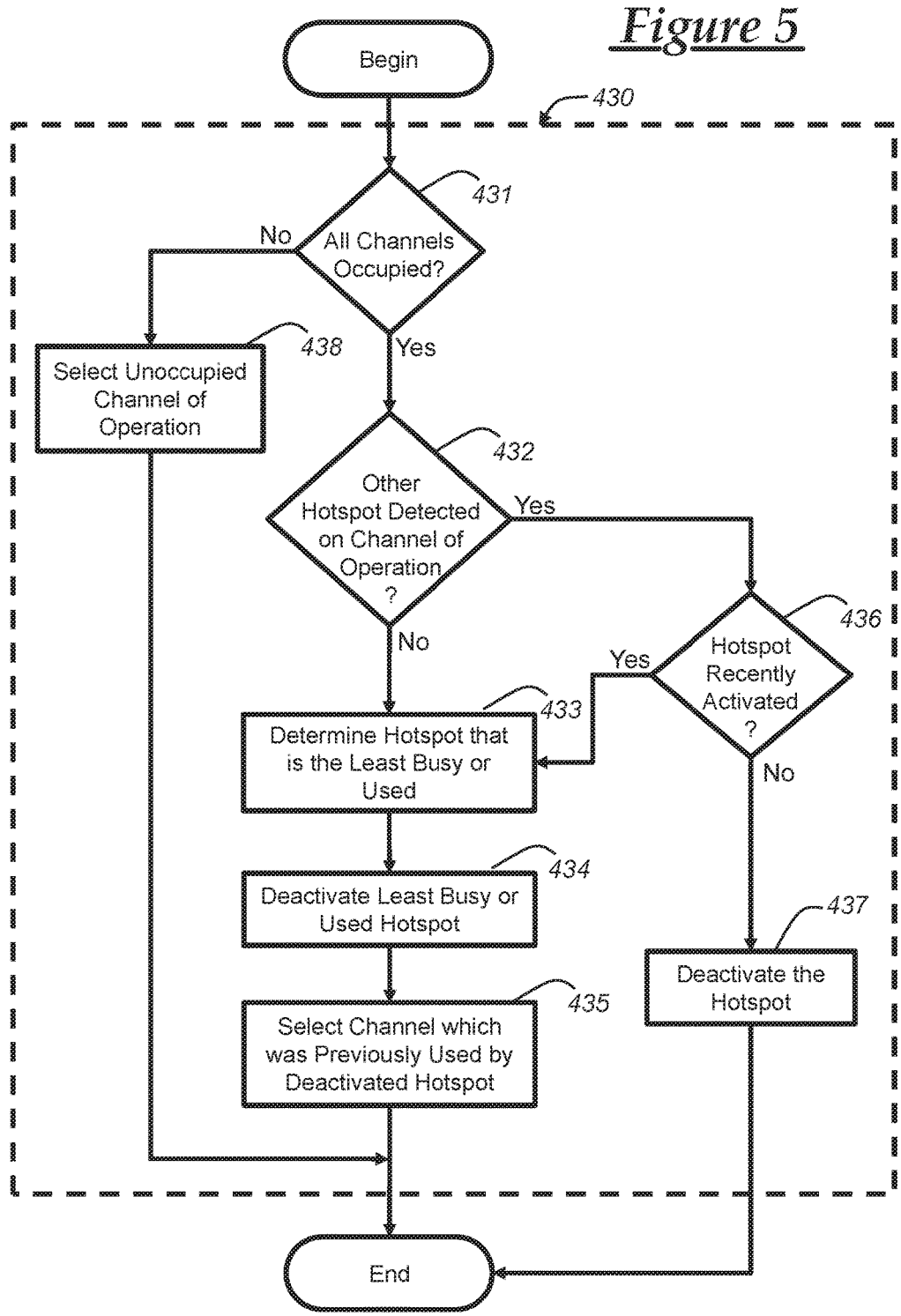
FIG. 5 shows an embodiment of a hotspot coordination policy used in the method of FIG. 4.

FIG. 5 shows one such embodiment of the hotspot coordination policy. According to this embodiment, first, in step 431, a determination is made as to whether all of the channels of operation are occupied by vehicle hotspots. In another embodiment, it may be desirable to determine whether all of the channels of operation are occupied by any hotspot, including non-vehicle hotspots. A non-vehicle hotspot is any hotspot that is not a part of vehicle electronics 20. Or, it may be desirable to limit the vehicle's hotspots to only consider using a subset of all of the possible channels of operation (e.g., only considering channels 1, 6, and 11 when selecting a channel of operation for the hotspot of interest or other vehicle hotspot). For example, if the policy only considers (and only configures) the WAPs 40a-d to use channels 1, 6, and 11, then the complexity of the policy would be reduced due to the fact that there are less channel selection options to consider and there would be less adjacent channel interference. Regardless, any of these determinations may be carried out by process 74 of controller 70 whereby the data compiled via the initial scan may be used to report as to which channels of operation are being used by which devices. Upon ascertaining that one or more channels are not being utilized by any vehicle hotspots, the method may proceed to step 438; otherwise, the method may proceed to step 432.

In certain embodiments, however, it may be desirable to make other determinations in addition to, or in lieu of, the determination of whether all of the channels are occupied. As seen in FIG. 3, the channels of operation that are adjacent to one another are staggered such that they overlap. Herein, an "adjacent channel" of a certain channel of operation is any channel with which the channel of operation may have an overlap of frequencies or may be the immediately next and preceding channels. Adjacent channel interference may prove to be more of a problem in certain cases than co-channel interference. Therefore, it may be more desirable to have two access points operate over channel 1 than have one access point operate over channel 1 and another over channel 2. In these cases, it should be determined whether there are any unoccupied channels such that there is no adjacent channel interference. If so, then the method can proceed to step 438; otherwise, step 432 may be carried out.

In another example, it may desirable to determine the amount, or probable amount, based on the results of the scan of co-channel interference and adjacent channel interference. Then, a determination as to which channel of operation, if operated upon by the hotspot, would prove to cause less interference problems may be made. Such a determination can be made and assessed using metrics such as the Signal-to-Noise ratio (SNR) (i.e. wherein the noise constitutes the interference from other adjacent channels) and the Signal-to-Interference ratio (SIR) (i.e. wherein the interference is the co-channel interference).

After it has been determined that all channels of operation are occupied, then step 432 may be carried out wherein it is determined whether another vehicle hotspot is using the same channel of operation as the hotspot of interest. In an alternative embodiment, it may be determined whether any vehicle or non-vehicle hotspot is operating over the same channel of operation. This determination may be made by processing the results of the initial scan using controller 70 and processor 74. Or, if only the vehicle WAPs' channels of operation are needed, then this determination may be made by querying the router configuration settings to determine the channels of operation of WAPs 40*a-d*. If two vehicle WAPs have the same channel of operation then step 436 may be carried out; otherwise, the method may proceed to step 433. In the case of a non-vehicle hotspot using the same channel of operation as the hotspot of interest, then step 433 may be carried out.

In step 433, it is determined which vehicle hotspot is the least busy or used. Herein, the "least busy" hotspot is the hotspot that is using the least amount of bandwidth or any other metric that may be measured and indicative of the comparative busyness of the hotspots. The "least used" hotspot is the hotspot the hotspot that is connected to the least amount of devices, the hotspot that is providing access to devices whose functions are less preferential than others, or any other metric that may be measured and indicative of the comparative usage of the vehicle hotspots. For example, the amount of bytes per second may be measured by the individual vehicle hotspots 40*a-d*, by the initial scan, or their averages may be retrieved from memory 72. Upon determining which hotspot is currently transferring, or most likely to transfer, the least amount of bytes, then the hotspot coordination policy may instruct this hotspot to be deactivated (see step 434). Alternatively, one or more of the vehicle hotspots may be configured to use certain channels of operation based on their bandwidth usage and, according to the hotspot coordination policy, the hotspots may be configured to use these channels in lieu of deactivating them. For example, it may be desirable to configure the vehicle hotspots which use the least amount of bandwidth to operate over the same channel, while allowing hotspots which use a relatively high amount of bandwidth use their own channel that is non-adjacent to any other currently used channels of operation.

In another embodiment, the amount of usage for each of the plurality of vehicle hotspots may be determined. Herein, "amount of usage" means the average amount of data transferred from the wireless device 90 to the router 30 via the vehicle hotspot, the average percentage of bandwidth usage, or any other metric or metrics that may indicate how much a vehicle hotspot is used relative to the other vehicle hotspots. Here, memory 72 may have a minimum threshold amount (e.g. 100 KB/hour) and, upon reaching step 433, process 74 may query the memory for this threshold value. Next, the processor may compare this value to the amount of data each vehicle hotspot has transferred for that day. The amount of data for each vehicle hotspot may be recorded by router 30 as the data passes through and then stored in memory 72 by controller 70. Upon this threshold not being established by one or more vehicle hotspots, these one or more vehicle hotspots may be deactivated (see step 434).

In yet another embodiment, if step 433 was reached via detecting that one or more non-vehicle hotspots were operating over the same channel of operation as the hotspot of interest, then other non-illustrated steps may be taken. For example, if a non-vehicle hotspot was recently discovered (i.e. there was no indication that this hotspot previously was active) via the initial scan, then the vehicle may just proceed as if this hotspot was non-existent. This may be useful if a vehicle is stopped at a light and next to a coffee shop that has a hotspot (e.g., WiFi hotspot). Here, because the vehicle will soon proceed to drive away from the non-vehicle WiFi hotspot, it may not be necessary or desirable to take this non-vehicle hotspot into consideration when determining the appropriate channel of operation for the hotspot of interest or other vehicle hotspots. In another case wherein the non-vehicle hotspot appears to be on the move such that it remains around the vehicle, such as a hotspot hosted by mobile device 90*a*, the method may treat this hotspot as a vehicle hotspot even though this hotspot (e.g., the hotspot hosted on device 90*a*) is not considered a part of vehicle electronics 20.

In another example, upon the method reaching step 433, the vehicle may prompt one or more vehicle users to indicate via visual display 38 and/or audio system 56 which devices and/or hotspots they wish to disable. The users may indicate their response via visual display 38, microphone 36, or push button 34. Upon receiving this information, controller 70 may process and/or store the results into memory 72.

In step 434, the least busy hotspot, as determined in step 433, is deactivated. Or, as described above, one or more other hotspots may be deactivated, depending on the particular embodiment of the hotspot coordination policy that is employed. In one embodiment, controller 70 may direct router 30 to shut down or otherwise disable operation of a hotspot, such as wireless access point 40*a*. Additionally, upon shutdown of WAP 40*a*, controller 70 may configure the vehicle electronics to connect all wireless vehicle components or devices that were connected to WAP 40*a* to an active vehicle hotspot (e.g., WAP 40*b-d*). Also, controller 70 may store details of this determination or deactivation into memory 72 such that it may be useful in future determinations of a similar nature. In another embodiment, more than one hotspot may be deactivated. For example, all vehicle hotspots that have not transferred at least a threshold amount of data (see step 433) may be deactivated.

In step 435, a channel of operation is selected for the hotspot of interest. Alternatively (e.g., in the case where there is not a hotspot of interest), or in addition, new channels of operation may be selected for any of the plurality of vehicle hotspots. Here, according to the illustrated embodiment, the channel that was previously operated over by the previously deactivated channel is selected (e.g., if WAP 40*b* was using channel 1 and then deactivated in step 434, channel 1 is selected for the hotspot of interest). After the new channel(s) of operation are selected, controller 70 may store these channel(s) into memory 72 or memory of another device. Additionally, controller 70 may configure data in memory 72 such that the selected channel of operation is the default channel of operation for the hotspot of interest (i.e. the channel of operation the hotspot will select when initially turned and no other vehicle hotspots are running).

In step 436, after it has been determined both that all channels of operation are occupied (see step 431) and that another vehicle hotspot is using the same channel of operation as the hotspot of interest, then the policy may determine whether the hotspot of interest was recently activated; if it is not, then the hotspot of interest is deactivated. This embodiment of the policy allows a vehicle hotspot to be deactivated such that two vehicle hotspots are not operating over the same channel of operation. It may be desirable to determine whether the hotspot of interest was recently activated because, if it was, then it may not be beneficial to deactivate it. Put differently, it may not be desirable to activate a hotspot and then subsequently deactivate it (because no channel of operation was unoccupied and/or there was another hotspot operation over the same channel) because there probably was a reason the hotspot was activated in the first place. However, if it was not recently activated, then the hotspot may be deactivated. Other determinations may be made, such as, if the hotspot was not recently activated, then determining whether the hotspot of interest or the other hotspot using the same channel of operation is being used less (i.e. a lower amount of usage), as may be determined in a manner similar to that described in step 433.

In any event, determining whether the hotspot was recently activated may be carried out in many different ways. For example, upon the hotspot of interest being turned on or activated, a timestamp may be stored in memory 72 that indicates the last time the hotspot was turned on or activated. Alternatively, memory 72 may keep an ordered list that is sorted by the time a hotspot was activated. Upon reaching this step, it may be determined that a hotspot is recently activated due to its position in the ordered list notwithstanding the amount of time it has been activated (i.e. the hotspot at the front of the list (i.e. most recently activated compared to the other vehicle hotspots) may be considered recently activated). Nonetheless, in the illustrated embodiment, if it is determined that the hotspot was recently activated or turned on, then the method proceeds to step 433; otherwise, step 437 is carried out.

In step 437, if it is determined in step 436 that the hotspot of interest was not recently activated, then the hotspot of interest is deactivated. Deactivation may be carried out as described in step 434. The only difference between the instant step and step 434 is that in the instant step the hotspot of interest is deactivated whereas in step 434 the least used hotspot is deactivated. However, as may be determined in alternative embodiments, other vehicle hotspots may be selected to be deactivated. In this regard, those hotspots that were selected to be deactivated would be deactivated according to any of the methods described above in step 434.

In step 438, if it is determined that there is an unoccupied channel of operation, then any one of the unoccupied channels of operation may be selected. "Unoccupied channel of operation" means any channel of operation wherein there is not a wireless access point or hotspot operating over that channel of operation. In the case that there are multiple channels of operation that are unoccupied, any of those channels may be selected. However, in some embodiments, it may be wise to select the channel of operation that will have the least amount of interference with other channels (adjacent channel interference). For example, with respect to FIG. 3, if channels 1 and 2 are the only unoccupied channels, then channel 1 would most likely be the better selection due to the fact that it would have less interference with adjacent channels. Here, the only adjacent channels with respect to channel 1 are channels 2, 3, 4, and 5. With respect to channel 2, there are channels 1, 3, 4, 5, and 6. Therefore, there would be less adjacent channel interference if channel 1 was selected (assuming all other channels besides channels 1 and 2 were being used).

In step 440, controller 70 may direct router 30 to configure the channel of operation for the hotspot of interest. In the case where new channels of operation have been selected for any of the plurality of vehicle hotspots (besides the new channel), then the controller 70 may direct router 30 to reconfigure the channel of operation for these hotspots as well. This may include merely setting an integer in the memory of router 30 or controller 70. In other embodiments, the channel may be set and, subsequently, the router and/or respective hotspot (i.e. the hotspot of interest) may need to be reset for the configuration to be effective. This may be carried out by router 30 and/or controller 70.

In step 450, the operation of the hotspots is monitored. Monitoring may merely consist of carrying out method 400 again, wherein it begins with performing a scan of the WiFi channels. Or, monitoring may consist of controller 70 being ready to detect changes in configuration, settings, or activation of the one or more vehicle hotspots and, upon the occurrence of such an event, carrying out method 400. In another embodiment, the data usage via each channel may be monitored and, upon determining that one or more channels are rarely being used or are being used for unnecessary reasons, then these channels may be deactivated. In such a case, after these channels are deactivated, then method 400 may be carried out again for purposes of reconfiguring the still-in-use or active wireless access points such that the optimal configuration of the channels of operation for the hotspots is determined via the hotspot coordination policy. Method 400 then ends.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of operating a plurality of vehicle hotspots at a vehicle, wherein the vehicle comprises vehicle electronics that include the plurality of vehicle hotspots, each of which operate over one of a plurality of possible channels of operation to provide wireless network connectivity for one or more wireless devices located in the vehicle or within a proximity of the vehicle, wherein the plurality of vehicle hotspots is comprised of a set of active hotspots and a set of deactivated hotspots, wherein the method is carried out by the vehicle electronics and comprises the steps of:
 detecting a change in operation of a first hotspot of the plurality of vehicle hotspots, wherein the detecting of the change in operation includes detecting that the first hotspot is now operating over a first channel of operation that is also being operated on by a second hotspot of the plurality of vehicle hotspots;
 in response to the detecting step, determining a first set of channels of operation being used by the set of active hotspots and determining whether all of the plurality of possible channels of operation are occupied by the set of active hotspots;
 when it is determined that all of the plurality of possible channels of operation are occupied by the set of active hotspots, determining to deactivate a selected vehicle hotspot and then deactivating the selected vehicle hotspot, wherein the selected vehicle hotspot is selected based on an amount of data usage of the selected vehicle hotspot, the selected vehicle hotspot being one of the plurality of vehicle hotspots other than the first hotspot or the second hotspot;
 selecting at least one channel of operation for at least one vehicle hotspot of the set of active hotspots in accordance with a hotspot coordination policy based on the determination of the first set of channels of operation, wherein, when it is determined that all of the plurality of possible channels of operation are occupied by the set of active hotspots, the selecting at least one channel of operation step is carried out after the step of determining to deactivate the selected vehicle hotspot; and
 configuring the at least one vehicle hotspot of the set of active hotspots to operate on the selected channel(s) of operation.

2. The method of claim 1, wherein the hotspot coordination policy is based at least in part on a determination as to the amount of data usage of each of the plurality of vehicle hotspots.

3. The method of claim 2, wherein the deactivating step includes selecting the selected vehicle hotspot based on the selected vehicle hotspot having an amount of data usage that is below a threshold amount and, subsequently, carrying out the selecting at least one channel of operation step, and wherein the selecting at least one channel of operation step includes selecting the channel of operation that the selected vehicle hotspot was previously operating on.

4. The method of claim 1, wherein the plurality of vehicle hotspots operate according to a wireless protocol, wherein the wireless protocol has a fixed number of possible channels of operation.

5. The method of claim 4, further comprising the step of determining unused channels of operation, wherein an unused channel of operation is a possible channel of operation that is not any of the one or more channels of operation determined to be in use by the plurality of vehicle hotspots in the determining a first set of channels of operation step.

6. The method of claim 5, wherein, when it is determined that not all of the plurality of possible channels of operation are occupied by the plurality of vehicle hotspots, the selecting step uses the hotspot coordination policy to select one of the unused channels of operation as the selected channel of operation.

7. The method of claim 1, wherein the determining a first set of channels of operation step further comprises determining one or more channels of operation being used by any non-vehicle hotspots, wherein a non-vehicle hotspot is a hotspot that is not part of the vehicle electronics.

8. A method for operating a first vehicle hotspot at a vehicle, wherein the vehicle includes vehicle electronics that include the first vehicle hotspot which operates to provide wireless connectivity for one or more wireless devices located in the vehicle or within a proximity of the vehicle, wherein the method is carried out by the vehicle electronics and comprises the steps of:
 detecting one or more channels of operation occupied by one or more other hotspots, the one or more other hotspots including one or more non-vehicle hotspots, wherein a non-vehicle hotspot is a hotspot that is not part of the vehicle electronics;
 selecting a channel of operation for the first vehicle hotspot according to a hotspot coordination policy, wherein the hotspots coordination policy includes:
  determining whether each of the one or more non-vehicle hotspots is moving with the vehicle; and
  for each of the one or more non-vehicle hotspots:
   when it is determined that a non-vehicle hotspot of the non-vehicle hotspot(s) is moving with the vehicle, then selecting the channel of operation in view of a channel of operation of the non-vehicle hotspot; and
   when it is determined that a non-vehicle hotspot of the non-vehicle hotspot(s) is not moving with the vehicle, then selecting the channel of operation without regard to the channel of operation of the non-vehicle hotspot; and
 configuring the first vehicle hotspot to use the selected channel of operation thereby allowing the one or more wireless devices to connect to the first vehicle hotspot through wireless communication over the selected channel of operation.

9. The method of claim 8, wherein the one or more other hotspots include one or more other vehicle hotspots, and wherein the vehicle hotspots operate according to a wireless protocol, wherein the wireless protocol has a fixed number of possible channels of operation.

10. The method of claim 9, further comprising the step of determining one or more unused channels of operation, wherein an unused channel of operation is a possible channel of operation that is not any of the one or more channels of operation determined to be in use by the one or more other hotspots in the detecting step.

11. The method of claim 10, wherein the hotspot coordination policy is based at least in part upon the amount of usage of the vehicle hotspots and based at least in part upon the determination as to any unused channels of operation.

12. The method of claim 11, further comprising the step of deactivating at least one vehicle hotspot that has an amount of usage that is below a threshold amount and, subsequently, carrying out the selecting step, and wherein the selecting step further comprises selecting the channel of operation to be a channel of operation that any of the deactivated vehicle hotspots were previously operating on.

13. The method of claim 12, wherein the deactivating step is only carried out when it is determined that there are no unused channels of operation.

14. The method of claim 8, wherein at least one of the one or more wireless devices are non-vehicle wireless devices.

15. The method of claim 14, further comprising the step of establishing a communication link between the first vehicle hotspot and one or more non-vehicle wireless devices via the selected channel of operation.

16. The method of claim 8, further comprising the step of configuring the vehicle electronics to store the selected channel of operation as a default channel of operation for the first vehicle hotspot.

17. The method of claim 8, wherein the selecting step further comprises selecting the channel of operation for the first vehicle hotspot to be a channel of operation different from a default channel of operation for the first vehicle hotspot when the default channel of operation is determined to be in use by the one or more other hotspots in the detecting step.

18. The method of claim 8, further comprising the step of detecting that one or more of the other hotspots has the same channel of operation as the first vehicle hotspot and, in response to this detection, carrying out the selecting and configuring steps.

* * * * *